Patented Sept. 17, 1935

2,015,005

UNITED STATES PATENT OFFICE 2,015,005

PREPARATION FOR PROTECTING AGAINST LIGHT OF SHORT WAVE LENGTH

Fitzgerald Dunning, Baltimore, Md., assignor to Hynson, Westcott & Dunning, Incorporated, Baltimore, Md., a corporation of Maryland No Drawing. Application May 25, 1933, Serial No. 672,903

16 Claims. (Cl. 167—90)

It has been proposed to protect materials against the action of light of short wave length, e. g. to protect the skin against sunburn and similar irritations produced by ultra violet light from other sources, by the use of preparations comprising an ultra violet light absorbing material such as, e. g. the sodium salt of naphthol disulfonic acid.

I have now found that the alkali metal salts of the mono and disulfonic acid derivatives of the ortho and para hydroxy diphenyls, possess the property of absorbing ultra violet light to a remarkable degree and moreover that these compounds are otherwise suitable for use in preparations designed to protect the skin against light of short wave lengths. In experimental tests it has been found, for instance, that alkaline reacting solutions of these compounds absorb the entire ultra violet spectrum of the quartz-mercury lamp up to a wave length of 400 millimicrons. I have determined that the compounds are suitable as to stability, freedom from any detrimental action on the skin, and quantity required to be used, for use in various preparations, e. g. creams, ointments and lotions adapted for application to the skin for the prevention of sunburn.

The following are illustrative examples of preparations suitable for application to the skin for protecting it against sunburn and containing the hydroxy diphenyl compounds.

*Example 1.*—15 parts by weight of cocoanut oil, 20 parts by weight of stearic acid and 3 parts by weight of petroleum jelly are fused together on a water bath. To the resulting fused mixture is added a solution of 1.6 parts by weight of KOH in 25 parts by weight of water and the mixture is heated at 80–85° C., with stirring, until the oil is saponified. Then there is added a solution of 2 to 5 parts by weight of the sodium salt of ortho or para hydroxy diphenyl mono- or di-sulfonate in 60 parts by weight of water. The heating is continued for about 15 minutes, whereupon the composition, which is a vanishing cream, is cooled and is ready for use. A suitable perfume may be added.

*Example 2.*—2 parts by weight of the sodium salt of sulfonated hydroxy diphenyl dissolved in 30 parts by weight of water are incorporated in known manner into 60 parts by weight of lanolin or similar neutral fat base to produce an ointment.

*Example 3.*—2 parts by weight of oil of lemon, 1 part by weight of oil of bergamot, 1.3 parts by weight of oil of lavender, 0.6 part by weight of extract of musk, and 1.25 parts by weight of tonka beans are dissolved in 250 parts by weight of ethyl alcohol. To this solution is added tincture of benzoin until a faint milkiness in the mixture appears, and then 2 to 5 parts by weight of the sodium salt of ortho or para hydroxy diphenyl mono- or di-sulfonate are added and dissolved. The solution is filtered repeatedly, if necessary, until it remains quite clear. The product is a lotion. Other oils may be used in place of those mentioned.

As will be evident to one skilled in the art, the compositions described in the foregoing examples may be modified as to the proportions of the ingredients, substitutions for the ingredients may be made, and other ingredients added.

I claim:

1. A preparation adapted to be applied to human skin for protecting it against ultra violet light comprising an alkali metal salt of a sulfonic acid derivative of the group consisting of the mono- and di-sulfonic acid derivatives of a mono-hydroxy diphenyl of the group consisting of the ortho- and para-hydroxy diphenyls.

2. A preparation as defined in claim 1 in which the alkali metal salt is a sodium salt.

3. A preparation as defined in claim 1 in which the sulfonic acid derivative is a mono-sulfonic acid derivative.

4. A preparation as defined in claim 1 in which the alkali metal salt is a sodium salt and the sulfonic acid derivative is a mono-sulfonic acid derivative.

5. A preparation as defined in claim 1 in which the sulfonic acid derivative is a di-sulfonic acid derivative.

6. A preparation as defined in claim 1 in which the alkali metal salt is a sodium salt and the sulfonic acid derivative is a di-sulfonic acid derivative.

7. A preparation as defined in claim 1 in which the mono-hydroxy diphenyl is the ortho-hydroxy diphenyl.

8. A preparation as defined in claim 1 in which the alkali metal salt is the sodium salt and the mono-hydroxy diphenyl is the ortho-hydroxy diphenyl.

9. A preparation as defined in claim 1 in which the sulfonic acid derivative is the di-sulfonic acid derivative and the mono-hydroxy diphenyl is the ortho-hydroxy diphenyl.

10. A preparation as defined in claim 1 in which the alkali metal salt is the sodium salt, the sulfonic acid derivative is the di-sulfonic acid derivative and the mono-hydroxy diphenyl is the ortho-hydroxy diphenyl.

11. A preparation as defined in claim 1 in which the mono-hydroxy diphenyl is the para-hydroxy diphenyl.

12. A preparation as defined in claim 1 in which the alkali metal salt is the sodium salt and the mono-hydroxy diphenyl is the para-hydroxy diphenyl.

13. A preparation as defined in claim 1 in which the sulfonic acid derivative is the mono-sulfonic acid derivative and the mono-hydroxy diphenyl is the para-hydroxy diphenyl.

14. A preparation as defined in claim 1 in which the sulfonic acid derivative is the di-sulfonic acid derivative and the mono-hydroxy diphenyl is the para-hydroxy diphenyl.

15. A preparation as defined in claim 1 in which the alkali metal salt is the sodium salt, the sulfonic acid derivative is the mono-sulfonic acid derivative and the mono-hydroxy diphenyl is the para-hydroxy diphenyl.

16. A preparation as defined in claim 1 in which the alkali metal salt is the sodium salt, the sulfonic acid derivative is the di-sulfonic acid derivative and the mono-hydroxy diphenyl is the para-hydroxy diphenyl.

FITZGERALD DUNNING.